(12) United States Patent  
Schultz, Jr.

(10) Patent No.: US 9,085,315 B2
(45) Date of Patent: Jul. 21, 2015

(54) TOBOGGAN STEERING AND BREAKING DEVICE

(71) Applicant: Edward H. Schultz, Jr., Kennett Square, PA (US)

(72) Inventor: Edward H. Schultz, Jr., Kennett Square, PA (US)

( * ) Notice: Subject to any disclaimer, the term of this patent is extended or adjusted under 35 U.S.C. 154(b) by 0 days.

(21) Appl. No.: 13/735,351

(22) Filed: Jan. 7, 2013

(65) Prior Publication Data

US 2013/0187350 A1  Jul. 25, 2013

Related U.S. Application Data

(60) Provisional application No. 61/589,016, filed on Jan. 20, 2012.

(51) Int. Cl.
  *B62B 17/08* (2006.01)
  *B62B 15/00* (2006.01)
  *B62B 13/04* (2006.01)

(52) U.S. Cl.
  CPC .............. *B62B 17/08* (2013.01); *B62B 13/046* (2013.01); *B62B 15/00* (2013.01)

(58) Field of Classification Search
  CPC ........ B62B 17/08; B62B 13/046; B62B 15/00
  USPC ...................... 280/18, 21.1, 845, 18.1, 28.11
  See application file for complete search history.

(56) References Cited

U.S. PATENT DOCUMENTS

| | | | | |
|---|---|---|---|---|
| 32,351 | A * | 5/1861 | Clark | 188/8 |
| 1,568,493 | A * | 1/1926 | Allen | 280/845 |
| 1,580,224 | A * | 4/1926 | Tatro | 280/18 |
| 2,241,733 | A * | 5/1941 | Perry | 280/18 |
| 2,738,845 | A * | 3/1956 | Bizjak | 180/182 |
| 2,910,708 | A * | 11/1959 | Albright | 441/65 |
| 3,104,116 | A * | 9/1963 | Knight, Jr. | 280/18 |
| 3,937,483 | A * | 2/1976 | Simmons | 280/21.1 |
| 4,256,319 | A * | 3/1981 | Winter | 280/18 |
| 5,277,141 | A * | 1/1994 | Csepregi | 114/43 |
| 5,516,126 | A * | 5/1996 | Myers | 280/14.28 |
| 6,655,701 | B2 * | 12/2003 | Oberpriller | 280/21.1 |
| 2002/0063404 | A1 * | 5/2002 | Lafond | 280/14.21 |
| 2003/0222419 | A1 * | 12/2003 | Geary | 280/21.1 |
| 2009/0066043 | A1 * | 3/2009 | Wasserman | 280/14.21 |

* cited by examiner

*Primary Examiner* — J. Allen Shriver, II
*Assistant Examiner* — Bridget Avery
(74) *Attorney, Agent, or Firm* — David G. Grossman

(57) ABSTRACT

A toboggan steering and breaking device employs a first mounting bracket, a first steering blade; a first steering lever; a second mounting bracket; a second steering blade; and a second steering lever. The first mounting bracket mounts to a toboggan deck. The first mounting bracket restrains the first steering blade. The first steering lever is configured to push the first steering blade through a first void in the deck of the toboggan. The second mounting bracket mounts to the toboggan deck. The second mounting bracket restrains the second steering blade. The second steering lever is configured to push the second steering blade through a second void in the deck of the toboggan.

19 Claims, 4 Drawing Sheets

TOBOGGAN STEERING AND BREAKING DEVICE

CROSS-REFERENCE TO RELATED APPLICATIONS

This application claims the benefit of U.S. Provisional Application No. 61/589,016, filed Jan. 20, 2011, entitled "Toboggan Steering and Breaking Device," which is hereby incorporated by reference in its entirety.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF EMBODIMENTS

Embodiments of the present invention relates to providing steering and braking capability to toboggans. The term toboggan refers to toboggans and toboggan like contrivances.

A typical simple toboggan may be hazardous to use. A simple toboggan may have no integral means for steering or braking to avoid collisions with objects or people.

Figure 1:
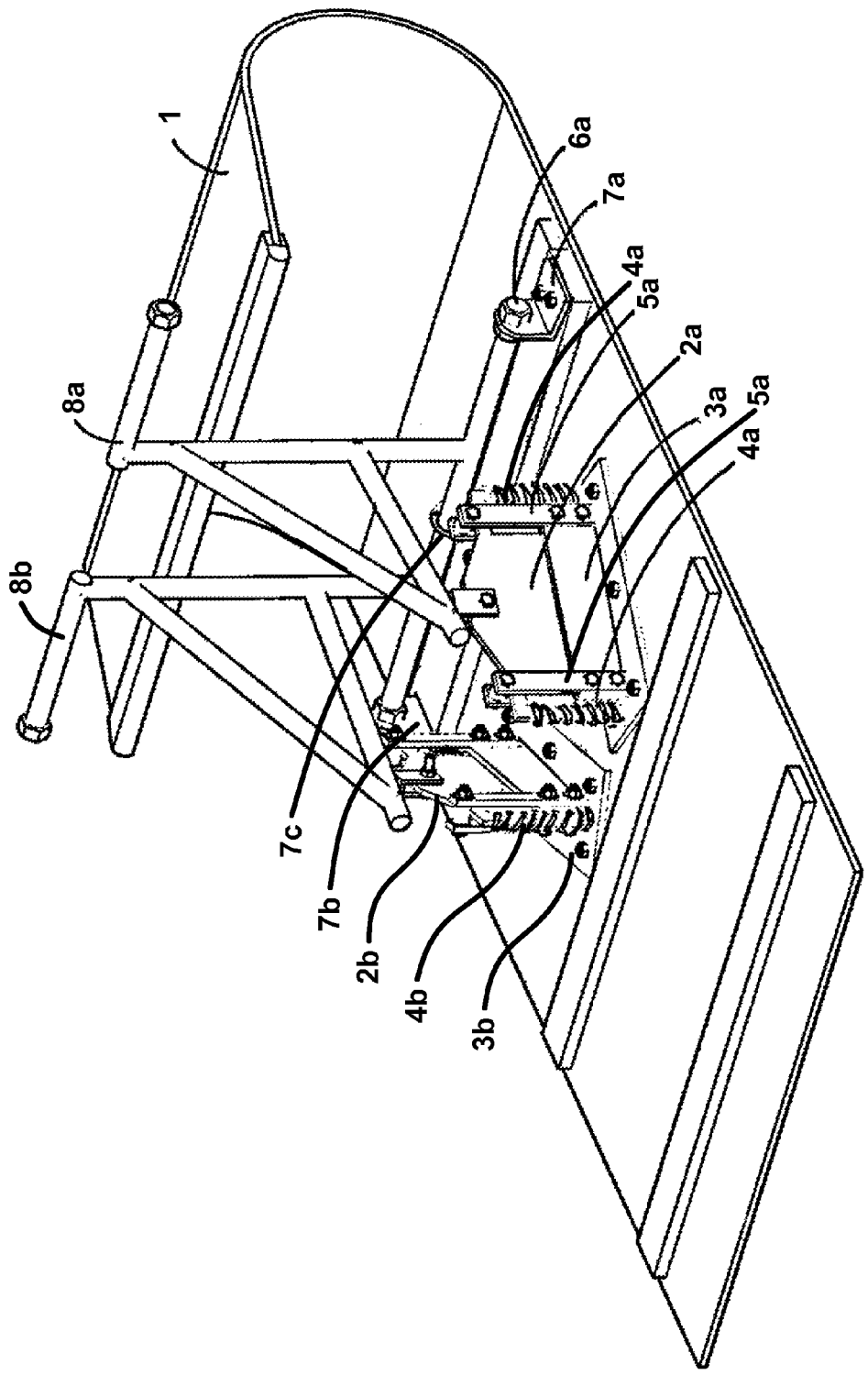
FIG. 1 is a model view of an example embodiment installed on a toboggan.
Figure 2:
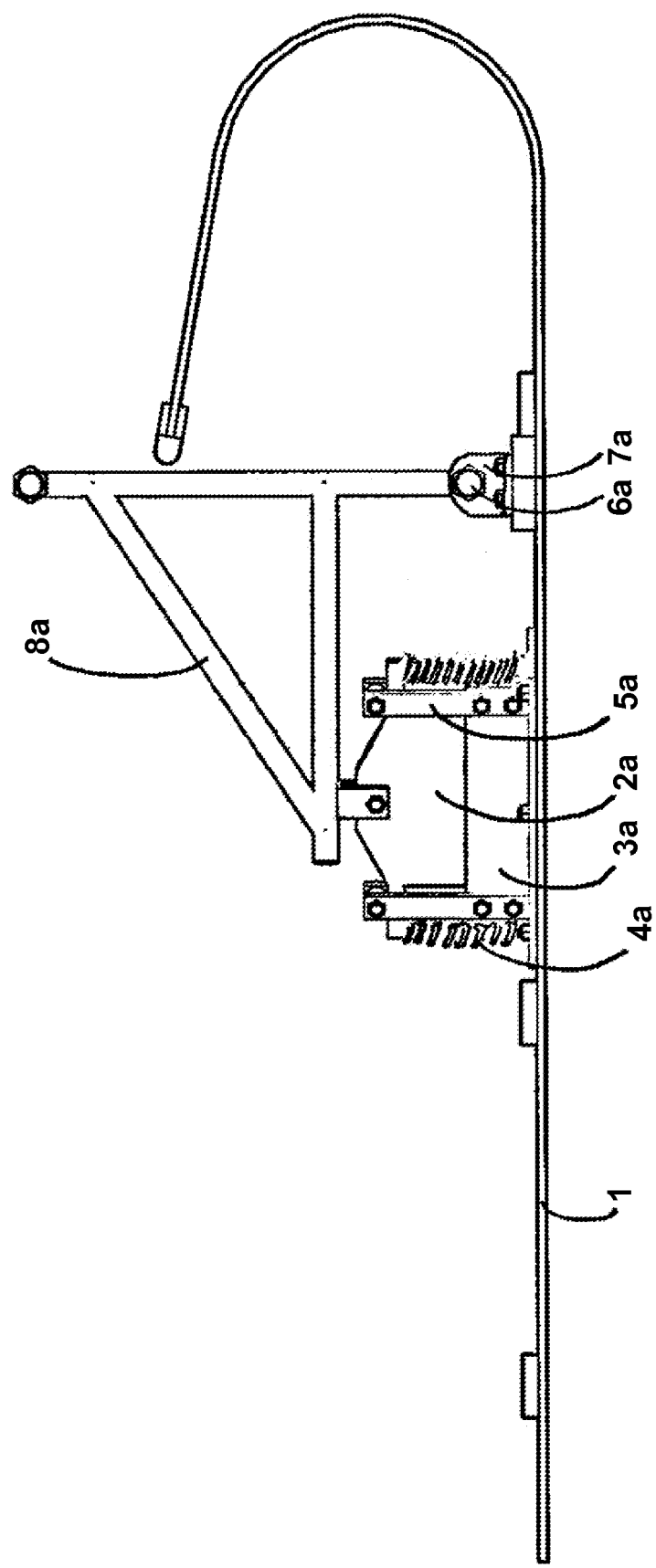
FIG. 2 is a side elevational view of an example embodiment installed on a toboggan.
Figure 3:
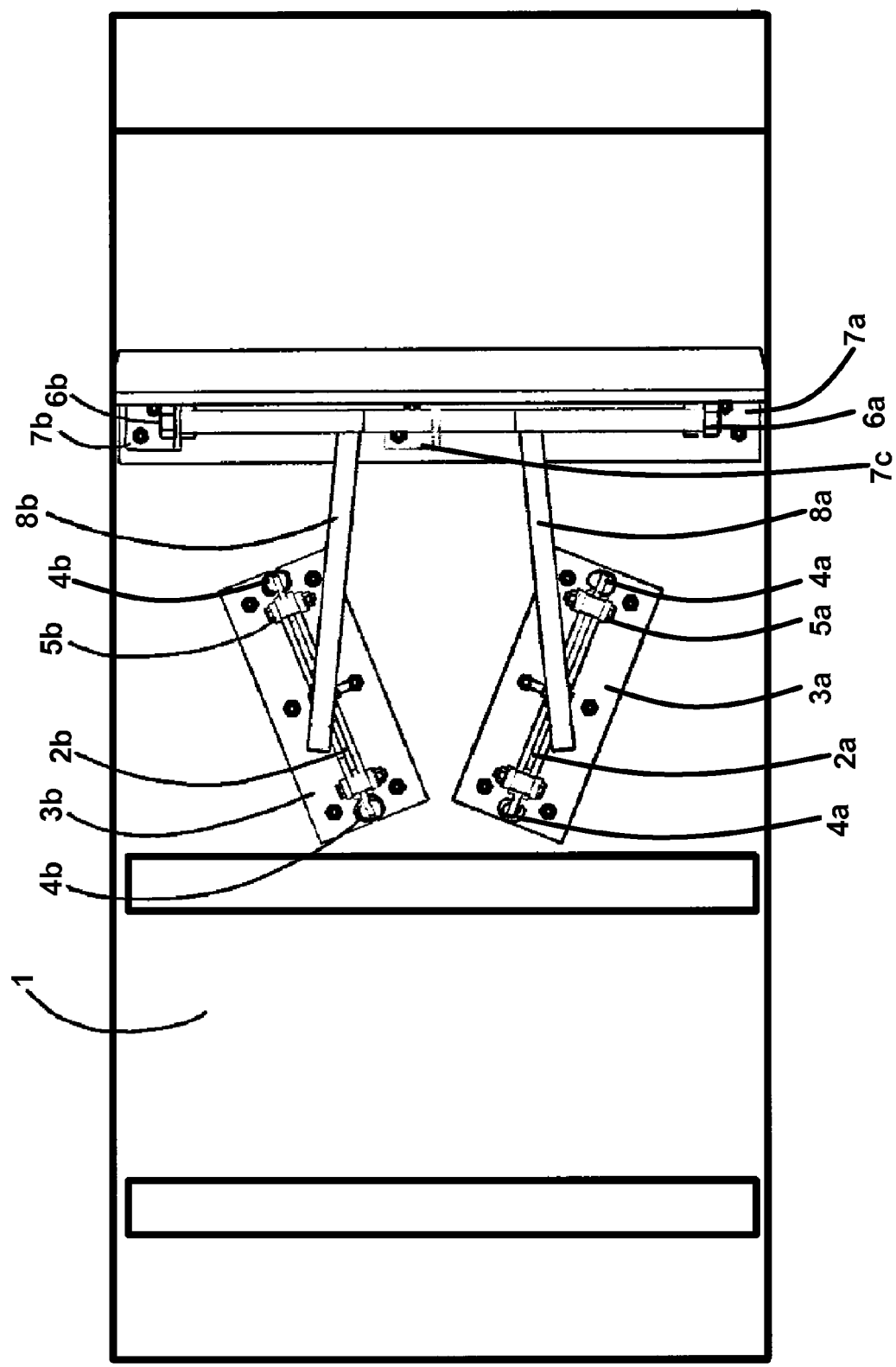
FIG. 3 is a top plan view of an example embodiment installed on a toboggan.
Figure 4:
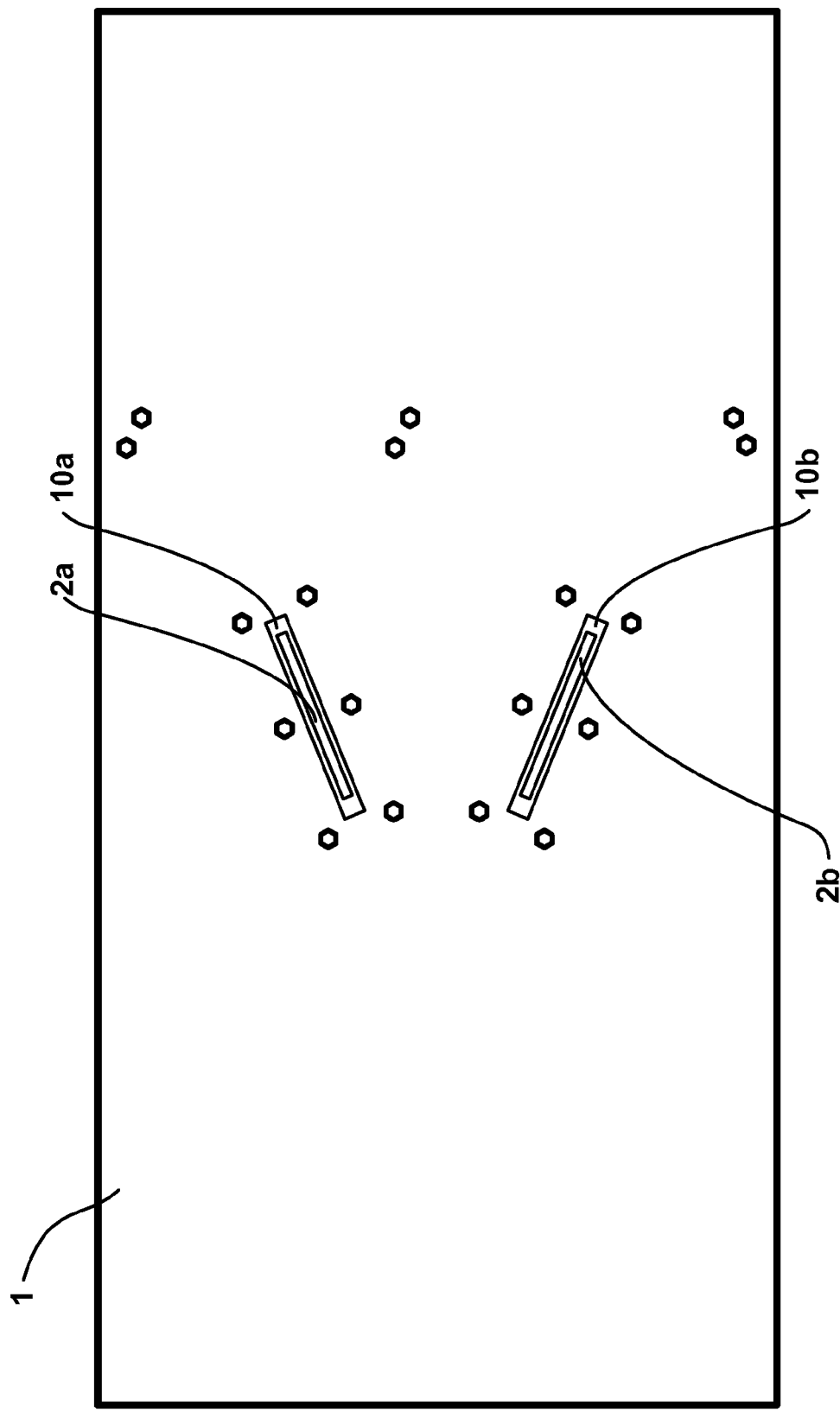
FIG. 4 is a bottom plan view of an example embodiment installed on a toboggan.

FIGS. 1 through 4 show various views of an embodiment of the present invention. Specifically: FIG. 1 is a model view of an example embodiment installed on a toboggan; FIG. 2 is a side elevational view of an example embodiment installed on a toboggan; FIG. 3 is a top plan view of an example embodiment installed on a toboggan; and FIG. 4 is a bottom plan view of an example embodiment installed on a toboggan.

In use, an operator may sit on toboggan (1). Toboggan (1) may be modified with a seat structure. According to some embodiments, operation of hand-operated levers (8a and/or 8b) may be used to steer or brake toboggan (1). This may improve the safe use of a toboggan (1) while also making it fun to operate. When steering lever(s) (8a and/or 8b) is pulled, a steering blade(s) (2a and/or 2b) respectively may protrude from the bottom of toboggan (1). Blade(s) (2a or 2b) may be configured at an angle to the direction of travel. When blade(s) (2a or 2b) come into contact with a suitable surface, blade(s) (2a or 2b) may cause toboggan (1) to steer in a direction related to the extension of blade(s) (2a or 2b). If both the levers (8a and 8b) are pulled, both blades (2a and 2b) may protrude from the bottom of toboggan (1) causing a braking action of toboggan (1). In some embodiment, when pressure is taken off lever(s) (8a and/or 8b), blade(s) (2a and 2b) may retract due to spring action to a safe position above the bottom of the toboggan (1).

Referring to example FIG. 1, FIG. 2, FIG. 3 and FIG. 4, mounting bracket(s) (3a and/or 3b) may be bolted to toboggan (1). Steering blade(s) (2a and/or 2b) may be held in place by mounting bracket(s) (3a and/or 3b) respectively. Spring(s) (4a and/or 4b) may keep blade(s) (2a and/or 2b) in retracted position(s) respectively. Restraining bar(s) (5a and/or 5b) may limit the travel of blade(s) (2a and/or 2b) respectively and keep the blade(s) (2a and/or 2b) from exceeding fully retracted position(s) respectively. Steering lever(s) (8a and/or 8b) when pulled toward the rear of the toboggan, may pivot about pivot rod(s) (6a and/or 6b) respectively and push steering blades (2a and/or 2b) respectively down through the floor of toboggan (1). Pivot rod(s) (6a and/or 6b) may be held in place by pivot bracket(s) (7a, 7b, and/or 7c). Pivot rod(s) (6a and/or 6b) may be the same rod.

According to some embodiments, a cover may be installed over the steering/braking mechanism for safety. According to some embodiments, parts of the steering/braking mechanism may be constructed using metal. According to some embodiments, parts of the steering/braking mechanism may be constructed using plastic. According to some embodiments, parts of the steering/braking mechanism may be constructed using other materials having suitable strength such as metal, wood, plastic, carbon composite materials, ceramics, hybrid materials, or the like. The parts constructed of these materials may include: mounting bracket(s) (3a and/or 3b), steering blade(s) (2a and/or 2b), steering lever(s) (8a and/or 8b), pivot rod(s) (6a, and/or 6b), pivot bracket(s) (7a, 7b, and/or 7c), restraining bar(s) (5a, and/or 5b), spring(s) (4a and/or 4b), combinations thereof, or the like.

According to some embodiments of the present invention, a toboggan steering and breaking device may employ a first mounting bracket (3a), a first steering blade (2a); a first steering lever (a); a second mounting bracket (3b); a second steering blade (2b); and a second steering lever (8b). The first mounting bracket (3a) may mount to the deck of a toboggan (1). The first mounting bracket (3a) may restrain the first steering blade (2a). The first steering lever (8a) may be configured to push the first steering blade (2a) through a first void (10a) in the deck of toboggan (1). The second mounting bracket (3b) may mount to the deck of a toboggan (1). The second mounting bracket (3b) may restrain the second steering blade (2b). The second steering lever (8b) may be configured to push the second steering blade (2b) through a second void (10b) in the deck of toboggan (1).

According to some embodiments, spring(s) (4a and/or 4b) may be mounted between mounting bracket(s) (3a and/or 3b) and steering blade(s) (2a and/or 2b). According to some embodiments, spring(s) (4a and/or 4b) may be configured to hold steering blade(s) (2a and/or 2b) above void(s) (10a and/or 10b) respectively. Spring(s) (4a and/or 4b) may include multiple springs, tension rods, coil springs, tension leaves, or the like.

According to some embodiments, voids (10a and 10b) may be oriented across the width of the toboggan deck. The orientation of voids (10a and 10b) may be at fixed and opposing angles. The fixed and opposing angles may be between: +45 degrees and −45 degrees; +60 degrees and −60 degrees; +30 degrees and −30 degrees; or the like.

According to some embodiments, steering lever(s) (8a and/or 8b) may include hand position(s), foot position(s), and/or combinations thereof. According to some embodiments, first steering lever(s) (8a and/or 8b) may be configured to rotate around pivot rod(s) (6a and/or 6b) respectively. Pivot rod(s) (6a and/or 6b) may be affixed to toboggan (1) by pivot bracket(s) (7a, 7b, and/or 7c).

According to some embodiments, restraining bar(s) (5a and/or 5b) may be employed to restrain steering blade(s) (2a and/or 2b) respectively from exceeding a fully retracted position.

In this specification, "a" and "an" and similar phrases are to be interpreted as "at least one" and "one or more." References to "an" embodiment in this disclosure are not necessarily to the same embodiment.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) steering and braking toboggans. However, one skilled in the art will recognize that embodiments of the invention could be used to steer and brake other vehicles such as sleds, barges, saucers, or the like.

In addition, it should be understood that any figures that highlight any functionality and/or advantages, are presented for example purposes only. The disclosed architecture is sufficiently flexible and configurable, such that it may be utilized in ways other than that shown.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. An apparatus, comprising:
    a) a first mounting bracket mounted to a deck of a toboggan;
    b) a first steering blade restrained by said first mounting bracket at a first fixed angle relative to the deck of the toboggan;
    c) a first steering lever configured to push said first steering blade through a first void in said deck;
    d) a second mounting bracket mounted to said deck of said toboggan;
    e) a second steering blade restrained by said second mounting bracket at a second fixed angle relative to the deck of the toboggan, the second fixed angle different than the fixed angle; and
    f) a second steering lever configured to push said second steering blade through a second void in said deck.

2. The apparatus according to claim 1, further including a spring mounted between said bracket and said first steering blade.

3. The apparatus according to claim 1, further including a spring configured to hold said first steering blade above said first void.

4. The apparatus according to claim 1, further including a spring mounted between said second mounting bracket and said second steering blade.

5. The apparatus according to claim 1, further including a spring configured to hold said second steering blade above said second void.

6. The apparatus according to claim 1, wherein said first void and said second void are oriented across the width of said deck.

7. The apparatus according to claim 1, wherein said first steering lever includes at least one of the following:
    a) a hand position; and
    b) a foot position.

8. The apparatus according to claim 1, wherein said second steering lever includes at least one of the following:
    a) a hand position; and
    b) a foot position.

9. The apparatus according to claim 1, wherein at least one of the following is constructed of metal:
    a) the first mounting bracket;
    b) the first steering blade;
    c) the first steering lever;
    d) the second mounting bracket;
    e) the second steering blade; and
    f) the second steering lever.

10. The apparatus according to claim 1, wherein at least one of the following is constructed of plastic:
    a) the first mounting bracket;
    b) the first steering blade;
    c) the first steering lever;
    d) the second mounting bracket;
    e) the second steering blade; and
    f) the second steering lever.

11. The apparatus according to claim 1, wherein the first steering lever is configured to rotate around a first pivot rod.

12. The apparatus according to claim 1, wherein the second steering lever is configured to rotate around a second pivot rod.

13. The apparatus according to claim 1, further including:
    a) a first restraining bar configured to restrain said first blade from exceeding a fully retracted position; and
    b) a second restraining bar configured to restrain said second blade from exceeding a fully retracted position.

14. The apparatus according to claim 6, wherein said first void and said second void are oriented at fixed and opposing angles.

15. The apparatus according to claim 14, wherein said fixed and opposing angles are between +45 degrees and −45 degrees.

16. The apparatus according to claim 14, wherein said fixed and opposing angles are between +60 degrees and −60 degrees.

17. The apparatus according to claim 14, wherein said fixed and opposing angles are between +30 degrees and −30 degrees.

18. The apparatus according to claim 11, wherein a first pivot bracket affixes the first pivot rod to the toboggan.

19. The apparatus according to claim 12, wherein a second pivot bracket affixes the second pivot rod to the toboggan.

* * * * *